United States Patent
Kiefer et al.

(10) Patent No.: US 12,209,898 B2
(45) Date of Patent: Jan. 28, 2025

(54) CALIBRATION METHOD FOR A FLOW MEASUREMENT SYSTEM, FLOW MEASUREMENT SYSTEM AND COMPUTER PROGRAM PRODUCT

(71) Applicant: Siemens Aktiengesellschaft, Munich (DE)

(72) Inventors: Jürgen Kiefer, Bruchsal (DE); Wilko Wilkening, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/702,585

(22) PCT Filed: Sep. 22, 2022

(86) PCT No.: PCT/EP2022/076399
§ 371 (c)(1),
(2) Date: Apr. 18, 2024

(87) PCT Pub. No.: WO2023/066594
PCT Pub. Date: Apr. 27, 2023

(65) Prior Publication Data
US 2024/0418560 A1     Dec. 19, 2024

(30) Foreign Application Priority Data
Oct. 22, 2021   (DE) .......................... 102021211941.7

(51) Int. Cl.
*G01F 25/10*    (2022.01)
*G01F 1/667*    (2022.01)

(52) U.S. Cl.
CPC .............. *G01F 25/10* (2022.01); *G01F 1/667* (2013.01)

(58) Field of Classification Search
CPC ................................ G01F 1/667; G01F 25/10
See application file for complete search history.

(56) References Cited

U.S. PATENT DOCUMENTS

| | | |
|---|---|---|
| 5,533,408 A | 7/1996 | Oldenziel et al. |
| 2010/0281999 A1 | 11/2010 | Braum et al. |

(Continued)

FOREIGN PATENT DOCUMENTS

| | | |
|---|---|---|
| CA | 3124021 | 12/2020 |
| CN | 112067066 | 12/2020 |

(Continued)

OTHER PUBLICATIONS

PCT International Search Report and Written Opinion of International Searching Authority mailed Jan. 20, 2023 corresponding to PCT/EP2022/076399 filed Sep. 22, 2022.

(Continued)

*Primary Examiner* — Peter J Macchiarolo
*Assistant Examiner* — John M Royston
(74) *Attorney, Agent, or Firm* — Cozen O'Connor

(57) ABSTRACT

A flow measurement system for performing an adjustable concurrent recalibration during a measurement operation, a computer program product which simulates operational behavior of the flow measurement system and a method for calibrating the flow measurement system that is mounted on a tube that encloses a medium, wherein the flow measurement system is provided in an active operating state and the flow measurement system includes a first flow rate sensor, where an ultrasound pulse is emitted into the tube wall via a first or second ultrasonic head of the first flow rate sensor, an ultrasound echo is received via the second ultrasonic head, the signal propagation time of the ultrasound pulse and echo are determined, a tube wall thickness is determined based on the determined signal propagation time, and a calibration parameter of the first flow rate sensor is set, where the calibration parameter includes at least the tube wall thickness.

14 Claims, 5 Drawing Sheets

(56) References Cited

U.S. PATENT DOCUMENTS

| | | | | |
|---|---|---|---|---|
| 2014/0012507 A1* | 1/2014 | Trehan | ............... | G01V 11/002 |
| | | | | 702/12 |
| 2017/0153136 A1 | 6/2017 | Shin | | |
| 2017/0286572 A1 | 10/2017 | Hershey et al. | | |
| 2018/0149511 A1 | 5/2018 | Ploss et al. | | |
| 2019/0383604 A1* | 12/2019 | Tamura | ............... | G01B 17/02 |
| 2020/0326216 A1 | 10/2020 | Sarkissian et al. | | |

FOREIGN PATENT DOCUMENTS

| | | |
|---|---|---|
| DE | 102007019689 | 10/2008 |
| DE | 102007062913 | 6/2009 |
| DE | 102009002942 | 11/2010 |
| DE | 102015107752 | 11/2016 |
| EP | 0686255 B1 | 3/2000 |
| EP | 2534454 | 12/2012 |
| WO | 8808516 | 11/1988 |

OTHER PUBLICATIONS

International Preliminary Examination Report dated Oct. 17, 2023 based on PCT/EP2022/076399 filed Sep. 22, 2022.

* cited by examiner

CALIBRATION METHOD FOR A FLOW MEASUREMENT SYSTEM, FLOW MEASUREMENT SYSTEM AND COMPUTER PROGRAM PRODUCT

CROSS-REFERENCE TO RELATED APPLICATIONS

This is a U.S. national stage of application No. PCT/EP2022/076399 filed 22 Sep. 2022. Priority is claimed on German Application No. 10 2021 211 941.7 filed 22 Oct. 2021, the content of which is incorporated herein by reference in its entirety.

BACKGROUND OF THE INVENTION

1. Field of the Invention

The invention relates to a flow measurement system, a computer program product for simulating the operational behavior of the flow measurement system and a calibration method for the flow measurement system.

2. Description of the Related Art

From the publication DE 10 2009 002 942 A1, a method is known for determining a tube wall thickness of a measuring tube in a Coriolis flowmeter. The measuring tube is part of a mechanical oscillation system that can be excited to oscillate by an exciter. The tube wall thickness is determined using a detected excitation input variable and a response variable of the oscillation system, which are used in a transfer equation.

The publication DE 10 2015 107 752 A1 discloses a method for determining a tube wall resonance frequency of a pipeline in the region of a measuring point. The method comprises emitting an ultrasonic signal and detecting a received signal. The pipe wall resonance frequency is determined based on a transmission function of a measuring point. Based on this, a tube wall thickness and/or a tube wall material can be determined.

The patent application DE 10 2007 019 689 A1 discloses an apparatus for determining a volumetric flow of a medium, which possesses two ultrasonic sensors arranged along a tube axis, via which ultrasonic pulses can be emitted diagonally into the tube in order to measure the volumetric flow. At least one of the ultrasonic sensors possesses piezoelectric elements, which are used as diagnostic sensors that are configured to emit ultrasonic pulses perpendicularly to the tube axis, into the tube, in order to determine diagnostic data.

U.S Pub. No. 2020/0326216 A1 discloses an ultrasonic flow meter, which has a plurality of piezoelectric transducers. Here, a first and second piezoelectric transducer are configured to transmit ultrasonic pulses obliquely into a tube, to which the ultrasonic flow meter is fastened. A third piezoelectric transducer is positioned between the first and second transducer and is configured to transmit and receive ultrasonic pulses perpendicularly to the tube axis. An internal diameter of the tube can be determined on the basis thereof.

U.S. Pub. No. 2017/0153136 A1 shows a flow meter that can be clamped to a tube and that has an automatic function for determining a tube wall thickness. To this end, when sweeping a frequency spectrum, a resonant frequency is excited and recorded. The tube wall thickness is determined on the basis of this and information on an external tube diameter and material information regarding the tube wall.

Flow meters are used in a variety of applications, for example, process plants, to measure flow velocities or throughputs in tubes. There are increasing demands here on measurement accuracy, longevity and ease of installation.

SUMMARY OF THE INVENTION

It is an object of the invention to provide a flow measurement system and an associated calibration method that offers an improvement in at least one of the above-outlined aspects.

This and other objects an advantages are achieved in accordance with the invention by a method for calibrating a flow measurement system that is mounted on a tube that encloses a medium in its lumen, where the flow rate, and thus the flow velocity of the medium, is to be measured. The medium can, for example, be a gas, a liquid, a suspension, a foam, or a thick matter. The method comprises a first step, in which the flow measurement system is provided in an active operational state and is suitable for non-invasive flow measurement. The flow measurement system comprises a first flow rate sensor that is mounted on the tube. In the active state, the first flow rate sensor is suitable for emitting an ultrasonic pulse through a tube wall into the lumen of the tube.

The method also comprises a second step, in which an ultrasonic pulse is emitted into the tube wall via a first or second ultrasonic head. The ultrasonic pulse can be introduced directly into the tube wall in the region of the ultrasonic heads. The first and second ultrasonic heads are part of the first flow rate sensor and are assigned thereto. The emitted ultrasonic pulse traverses the tube wall and is reflected off an inside of the tube wall. The reflected ultrasonic pulse is received in the second step via the second ultrasonic head as an ultrasonic echo. Between the emission of the ultrasonic pulse and the receipt of the ultrasonic echo, there is therefore a signal propagation time, in which the tube wall is traversed twice.

The method likewise has a third step, in which the signal propagation time of the ultrasonic pulse or ultrasonic echo is determined. Based on the signal propagation time, a tube wall thickness is determined in the third step. To this end, account is taken of at least one directional angle between a tube axis and a main direction of propagation of the ultrasonic pulse. This results in a calculatable relationship between the signal propagation time and the tube wall thickness. Additionally, using the tube wall thickness and information about the external tube diameter, an internal tube diameter can be determined in the third step. Such information can, for example, be provided by a user input.

The method further comprises a fourth step, in which at least one calibration parameter of the first flow rate sensor is set. The at least one calibration parameter here comprises the tube wall thickness determined in the third step and/or the internal tube diameter. Ultrasonic heads provide a greater degree of measurement accuracy, so that the tube wall thickness can be determined with increased precision by the inventive method. The method can be implemented automatically, permitting fast recalibration of the flow measurement system during operation. In particular, the flow measurement system can be adapted to variable tube wall thicknesses, and thus variable internal tube diameters. The tube wall thickness can be reduced by corrosion of the tube wall, or increased by soiling on the tube wall. Additionally, tube walls are being manufactured with reduced precision, so that an exact tube wall thickness is frequently not known.

Using the inventive method, the consequences of such effects on the measurement accuracy of the flow measurement system can be compensated for. The at least one calibration parameter can, for example, be set by storing corresponding values in an evaluation unit of the flow measurement system.

In accordance with the invention, in the second step of the method the ultrasonic pulse is emitted into the medium in a diagonal direction with regard to the tube axis, and thus into the tube wall. Furthermore, the second ultrasonic head and the ultrasonic reflector can be arranged with respect to the first ultrasonic head such that the main directions of propagation of the ultrasonic pulse and of the flow measurement pulse do not intersect. Thus, with the ultrasonic reflector, a measurement operation is ensured in a simple manner at the same time as the inventive method is being performed. The inventive emission of the ultrasonic pulse into the medium, and thus into the tube wall, in a diagonal direction enables a surface roughness to be determined on an inside of the tube wall. To this end, an intensity of the ultrasonic echo received in the second step can be detected. This is compared to an intensity of the emitted ultrasonic pulse. The rougher the inside of the tube wall, the stronger the reflection back to the second ultrasonic head. The lower the ratio between the intensity of the received ultrasonic echo and the intensity of the emitted ultrasonic pulse, for example, the less the surface roughness of the inside of the tube wall. Based on this, the surface roughness of the inside of the tube wall can be determined. To this end, account can be taken of a value table and/or information about the material of the tube wall. In particular when using the Hagen-Poiseuille equation, this enables the throughput of medium in the tube to be determined precisely. The determined surface roughness of the inside of the tube wall is inventively set as a calibration parameter in the fourth step. The accuracy that can be achieved by calibration with the inventive method is thus further increased. Additionally, further analyses can also be performed to determine the tube wall thickness and the surface roughness.

In one embodiment of the method, an ultrasonic reflector is assigned to the second ultrasonic head of the first flow rate sensor, and is suitable for deflecting the ultrasonic pulse emitted in the second step. As a result of the deflection, the ultrasonic pulse, which is to be used to determine the tube wall thickness, can be rerouted away from a flow measurement pulse. As a result, it can be avoided that the ultrasonic pulse spatially overlaps with the flow measurement pulse. Consequently, a measurement operation and the inventive method can be performed simultaneously. Furthermore, the ultrasonic reflector has dimensions that correspond to a multiple of a wavelength of the ultrasonic pulse. Additionally, it is possible for the ultrasonic pulse to easily be by the ultrasonic reflector in a direction that is favorable for determining the tube wall thickness.

In a further embodiment of the method the first ultrasonic head can be configured to emit the flow measurement pulse. The first ultrasonic head can consequently be operated independently of the second ultrasonic head. The first and second ultrasonic head can thus be configured optimally for their respective tasks. This means that simple and cost-efficient ultrasonic heads can be used for the first and second ultrasonic head. Alternatively or additionally, the first and second ultrasonic head can also be configured in an integrated manner as a combined ultrasonic head. In particular, the first and second ultrasonic head can be configured as independently actuatable segments of the combined ultrasonic head. Further, the first and second ultrasonic head can use a shared piezo-element, which can be actuated segment by segment via independent electrodes. Such a combined ultrasonic head is compact and thus saves space. In a flow measurement system, it is sufficient if only the first flow rate sensor is configured to perform the inventive method. A corresponding adaptation of a second flow rate sensor is unnecessary. Overall, the inventive method can be adapted to different requirements as regards compactness and cost efficiency.

Further, the ultrasonic pulse emitted in the second step can be distinguished from the flow measurement pulse by an electronic filter, in particular a bandpass filter. The electronic filter is formed in the evaluation unit of the flow measurement system. This enables the inventive method to be implemented at the same time as a measurement operation. In this case, overlaps between the flow measurement pulse and the ultrasonic pulse or the ultrasonic echo thereof can also be accepted. As a result, operation of the first and second ultrasonic head that is coordinated across time slices can be avoided. For example, the flow measurement pulse and the ultrasonic pulse can have different frequencies or different pulse patterns. The electronic filter can be formed by electronic components and/or an algorithm in the flow measurement system.

Alternatively or additionally, the ultrasonic pulse and the flow measurement pulse can be configured to be distinguishable by emitting them with a time delay. The first and second ultrasonic head are in this case operated in a time slice mode. the tube wall thickness is less than the internal tube diameter. As a result, a signal propagation time of the ultrasonic pulse, which is used to determine the tube wall thickness, is shorter than a signal propagation time of a flow measurement pulse with which the flow velocity of the medium is measured. A first time slice for measuring the tube wall thickness can be established to be shorter than a second time slice in which the flow velocity of the medium, in other words its throughput, is measured via the flow measurement pulse. As a result, the measurement operation in which the flow velocity of the medium is measured is only minimally adversely affected by the inventive method. The disclosed method further permits a compact design of the first flow rate sensor, in which the main directions of propagation of the ultrasonic pulse and of the flow measurement pulse intersect.

Furthermore, the ultrasonic pulse emitted in the second step can have a bandwidth of 25 kHz to 8 MHz, preferably from 40 kHz to 6 MHZ, further preferably from 50 kHz to 4 MHZ. Alternatively or additionally, the ultrasonic pulse can have a pulse duration of 0.1 us to 5.0 ms, preferably from 0.15 us to 3 ms, particularly preferably from 0.25 us to 1.0 ms. The invention is based on, among other things, the surprising finding that a corresponding broadband and short ultrasonic pulse in the second step also produces an ultrasonic echo, enabling a precise determination of the tube wall thickness. In particular, with such an ultrasonic pulse, even when emitted in the diagonal direction, a sufficient ultrasonic echo is reflected to enable the tube wall thickness to be determined.

In a further embodiment of the method, the third step can be performed while taking into account information about a material of the tube wall. The material of the tube wall is essentially used to ascertain the velocity of sound in the tube wall. The information about the material of the tube wall can be provided directly by a user input and/or by information about the type of construction of the tube, which can, for example, be stored in the evaluation unit. Alternatively or additionally, information about a connection of the first flow rate sensor to the tube can also be taken into account. As a function of the connection of the first flow rate sensor to the tube, an expected intensity of the ultrasonic echo can, for example, be predetermined.

Additionally, in accordance with the disclosed method, using the tube wall thickness determined in the third step any corrosion of the tube or any soiling of the tube can also be determined. In particular, the extent of the corrosion or soiling can also be determined. To this end, the tube wall thickness determined in the third step is compared to historical values for the tube wall thickness. In particular, a difference can be formed between the tube wall thickness determined in the third step and at least one historical value for the tube wall thickness. If the difference exceeds the amount of an adjustable threshold value, then a warning can be output to a user. This means that required maintenance operations can be identified at an early stage, so that downtimes in process plants in which the disclosed method is performed can be reduced.

The objects and advantages in accordance with the invention are also achieved by an evaluation unit that can be employed in a flow measurement system having at least one first flow rate sensor. The evaluation unit is suitable for receiving and evaluating measurement signals from the first flow rate sensor. Further, the evaluation unit can be configured to output a determined flow of a medium in a tube upon which the flow system can be mounted. In accordance with the invention, the evaluation unit is configured to be calibrated via at least one embodiment of the disclosed method. Accordingly the features of the method and/or of the flow measurement system described below can be transferred to the evaluation unit. The evaluation unit can be formed as a local evaluation unit that is accommodated in one of the flow rate sensors.

Alternatively, the evaluation unit can also be configured as an industrial controller, such as a Programmable Logic Controller (PLC), as a master computer, as a computer cloud or as a combination of these.

The objects and advantages in accordance with the invention are also achieved by an flow measurement system that comprises a first and a second flow rate sensor, which can be mounted on a tube in order to non-invasively measure the flow of a medium in the tube. The first flow meter comprises a first ultrasonic head to emit a flow measurement pulse. The second flow rate sensor is configured to receive an echo of the flow measurement pulse. The first and second flow rate sensors cooperate to determine the flow of the medium in the tube, for example, via an evaluation unit. In accordance with the invention, the first flow rate sensor is provided with a second ultrasonic head, which is configured to determine an internal tube diameter. The second ultrasonic head can, for example, be configured to perform at least one embodiment of the above-disclosed method. The described features of the method can hence be transferred directly to the inventive flow measurement system. In accordance with the invention, the flow measurement system has an evaluation unit in accordance with the above-disclosed embodiment.

Furthermore, the second ultrasonic head can be configured to emit an ultrasonic pulse and/or to receive an ultrasonic echo. The ultrasonic pulse can be introduced by the second ultrasonic head directly into the tube wall. The ultrasonic pulse is reflected in an opposing region on the inside of the tube wall as an ultrasonic echo and can be received by the second ultrasonic head. The second ultrasonic head can be configured to emit the ultrasonic pulse, with regard to a tube axis, in a diagonal direction or substantially in a radial direction.

In one embodiment of the flow measurement system, the first flow rate sensor has at least one ultrasonic reflector that is configured to deflect the ultrasonic pulse emitted by the first and/or second ultrasonic head. The ultrasonic reflector can be arranged such that the ultrasonic pulse is transmitted substantially in a radial direction into the tube wall. As a result, this ensures an effective reflection of the ultrasonic pulse as an ultrasonic echo from an opposing region on the inside of the tube wall back to the second ultrasonic head. Such a clear ultrasonic echo in turn permits a precise determination of the internal tube diameter.

Additionally, the ultrasonic reflector can be configured to be partially transparent or as a switchable ultrasonic reflector. Using a partially transparent ultrasonic reflector, only the ultrasonic pulse or the ultrasonic echo can be deflected, but not the flow measurement pulse. The flow measurement pulse instead passes through the partially transparent ultrasonic reflector. As a result, the ultrasonic reflector can have increased dimensions and can be manufactured simply and cost-efficiently. Alternatively, the deflecting effect of the switchable ultrasonic reflector can be switched on and off. For example, a time slice mode can be implemented in this way, in which the first and second ultrasonic head are positioned close to one another and emit in substantially the same direction. By using such reflectors, different embodiments of the above-disclosed method can be reliably implemented. The flow measurement system in accordance with the disclosed embodiments also permits multiple embodiment of the method to be implemented cost-efficiently. As a result, the flow measurement system can easily be adapted to a variety of applications.

The objects and advantages in accordance with the invention are further achieved by a computer program product that is configured to simulate an operating behavior of a flow measurement system. For this, the computer program product can comprise commands that cause a computer to simulate the operating behavior of the flow measurement system.

In particular, the computer program product can be configured to simulate the operational behavior of the flow measurement system, because its structure is permanently predefined therein, i.e., an image of it is stored. Alternatively, the operational behavior can also be represented by an abstract computing model that is independent of the spatial structure of the flow measurement system. Further alternatively, the operating behavior can also be determined using a combination of these. The flow measurement system to be simulated is inventively configured in accordance with one of the above-described embodiments. The computer program product can have a physics module for the simulation, in which the flow measurement system is mapped and, for example, its ultrasonic-acoustic or signaling behavior can be reset under adjustable operating conditions. For example, the adjustable operating conditions include a temperature of the medium in the tube, a velocity of sound present in the medium, a viscosity of the medium, a flow velocity of the medium, a pressure of the medium, a flow behavior, in particular a turbulence behavior or a flow velocity profile. For this, the computer program product can have a data interface, via which corresponding data can be specified via a user input and/or other simulation-related computer program products. The computer program product can also have a data interface to output simulation results to a user and/or other simulation-related computer program products. The computer program products can, for example, be used to check the plausibility of signal propagation times detected by ultrasonic heads, or other sensor values for an installation in which the flow measurement system is to be employed. As a result, among other things, a defective component in the flow measurement system, such as a defective ultrasonic head, can be identified. In particular, it is possible to identify whether any determined corrosion, soiling or surface roughness of an inside of the tube wall may plausibly exist after a known duration of operation, or whether a defective component in the flow measurement system is to be expected. The invention is based among other things on the surprising finding that the disclosed embodiments of the methods can be modeled with increased precision with relatively little computational effort, for example, the reflection behavior off the tube wall opposite the first flow rate sensor. Accordingly, the inventive computer program product provides a comprehensive opportunity, which at the same time saves computing capacity, for monitoring and/or testing a corresponding flow measurement system. The computer program product can be formed as a "digital twin", as described in greater detail, for example, in the publication US 2017/0286572 A1, the content of which is incorporated herein by reference in its entirety. The computer program product can be configured to be monolithic, i.e., executable entirely on one hardware platform. Alternatively, the computer program product can be configured to be modular and to comprise a plurality of subprograms that can be executed on separate hardware platforms and to interact via a communicative data connection. In particular, the computer program product can be configured to be executed in a computer cloud. Further, owing to the inventive computer program product a flow measurement system can be tested and/or optimized using simulation, such as during a scheduled upgrade in a process plant.

The objects and advantages in accordance with the invention are additionally achieved by the use of a flow measurement system. In order to perform a measurement operation, the flow measurement system is fastened to a tube, through which a medium flows. Owing to the measurement operation it is possible to measure a flow velocity of the medium, and thus the throughput thereof. In accordance with the invention, the flow measurement system, which comprises at least one first flow rate sensor, is also employed during the measurement operation to determine a tube wall thickness of the tube. The measurement accuracy of the measurement operation is influenced by, among other things, the tube wall thickness, which is stored as a calibration parameter in an evaluation unit of the flow measurement system. The flow measurement system is accordingly used for adjustable concurrent recalibration during the measurement operation. Concurrent recalibration is here understood to mean a determination of the tube wall thickness during the measurement operation. In particular, a user can set the intervals at which recalibration is to be performed by determining the pipe wall thickness as a calibration parameter. To this end, the flow measurement system can be configured in accordance with at least one of the above-disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below in figures using individual forms of embodiment. The figures are to be read as complementary to one another in that the same reference characters have the same technical meaning in different figures. The features of the individual forms of embodiment can also be combined with one another. Further, forms of embodiment shown in the figures can be combined with the features outlined above, in which.

DETAILED DESCRIPTION OF THE EXEMPLARY EMBODIMENTS

Figure 1:
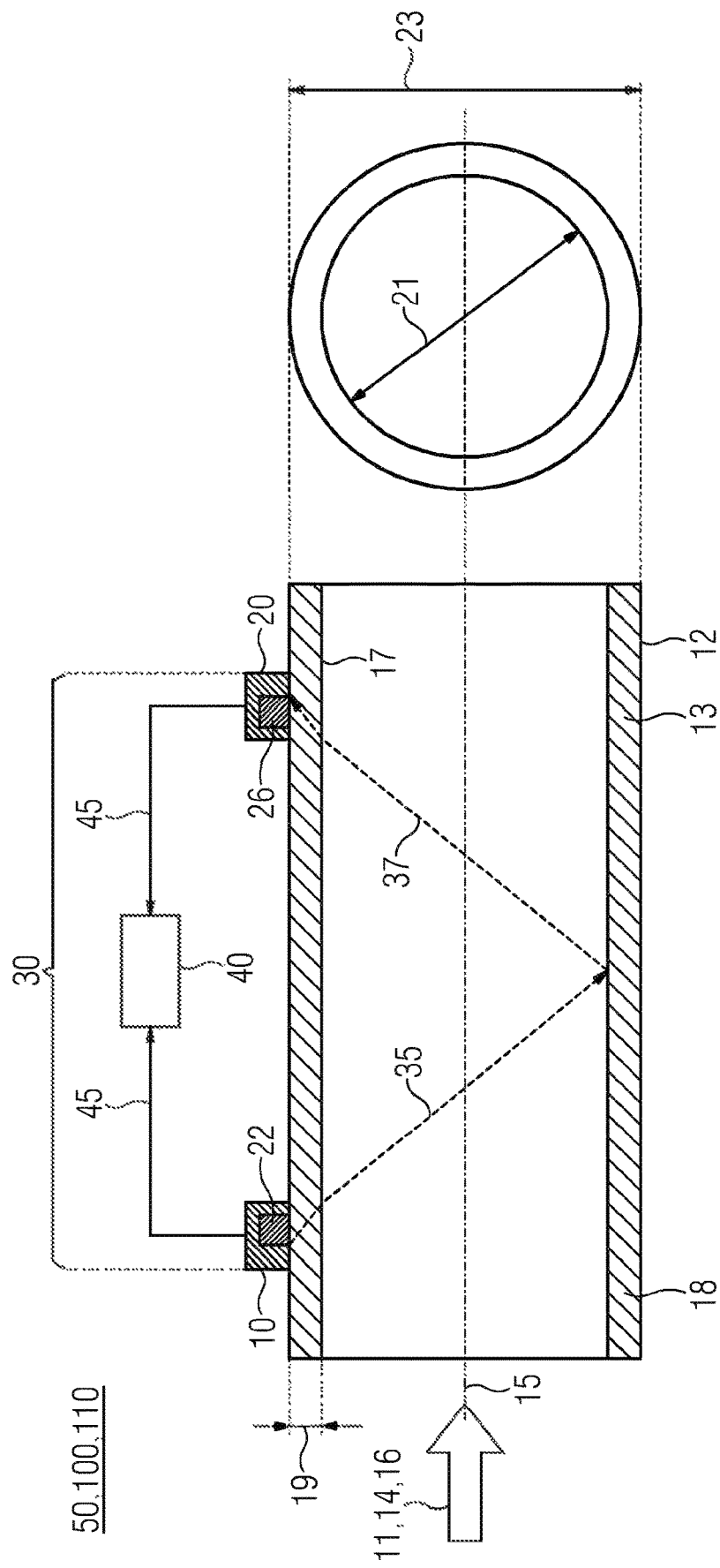
FIG. 1 schematically shows a structure of a flow measurement system in a longitudinal section and a cross-section in accordance with the invention.

FIG. 1 schematically shows a structure of a disclosed flow measurement system 30 in the longitudinal section. The flow measurement system 30 is here in a stage of a disclosed method 100 for calibrating the flow measurement system 30. The flow measurement system 30 comprises a first flow rate sensor 10 and a second flow rate sensor 20, which are mounted on a tube 12. The first and second flow rate sensors 10, 20 are coupled to an evaluation unit 40, which is also part of the flow measurement system 40. The flow measurement system 30 is here in an active, i.e., functional, state, so that a first step 110 of the disclosed method 100 in FIG. 1 has been concluded. The tube 12 has a tube wall 13, by which a medium 11 is enclosed which flows through the tube 12 along a tube axis 15. The medium 11 has a temperature 14 and a flow velocity 16. The flow velocity 16 of the medium 11 is to be determined in a measurement operation of the flow measurement system 30, in order on the basis thereof to calculate the flow of medium 11. The tube wall 13 has a tube wall thickness 19 and an internal tube diameter 21, resulting in a tube wall thickness 19 as shown on the right in FIG. 1 in cross-section. FIG. 1 shows a measurement operation, in which a flow measurement pulse 35 is sent into the medium 11 by a first ultrasonic head 22 in the first flow rate sensor 10. An echo 37 of the flow measurement pulse 35 is reflected off a tube wall 18 opposite the first and second flow rate sensor 10, 20. The echo 37 is received by a further ultrasonic head 26 that is arranged in the second flow rate sensor 20. A signal propagation time results for the flow measurement pulse 35 and its echo 37, and can be evaluated to determine the flow velocity 16. For this, measurement signals 45 are transmitted from the first and second flow rate sensor 10, 20 to the evaluation unit 40. In the stage shown in FIG. 1, the flow measurement system 30 is ready to perform further steps of the method 100, as described below. Further, the operating behavior of the flow measurement system 30 is simulated by a computer program product 50, not shown in greater detail, which is formed as a digital twin of at least the first flow rate sensor 10.

Figure 2:
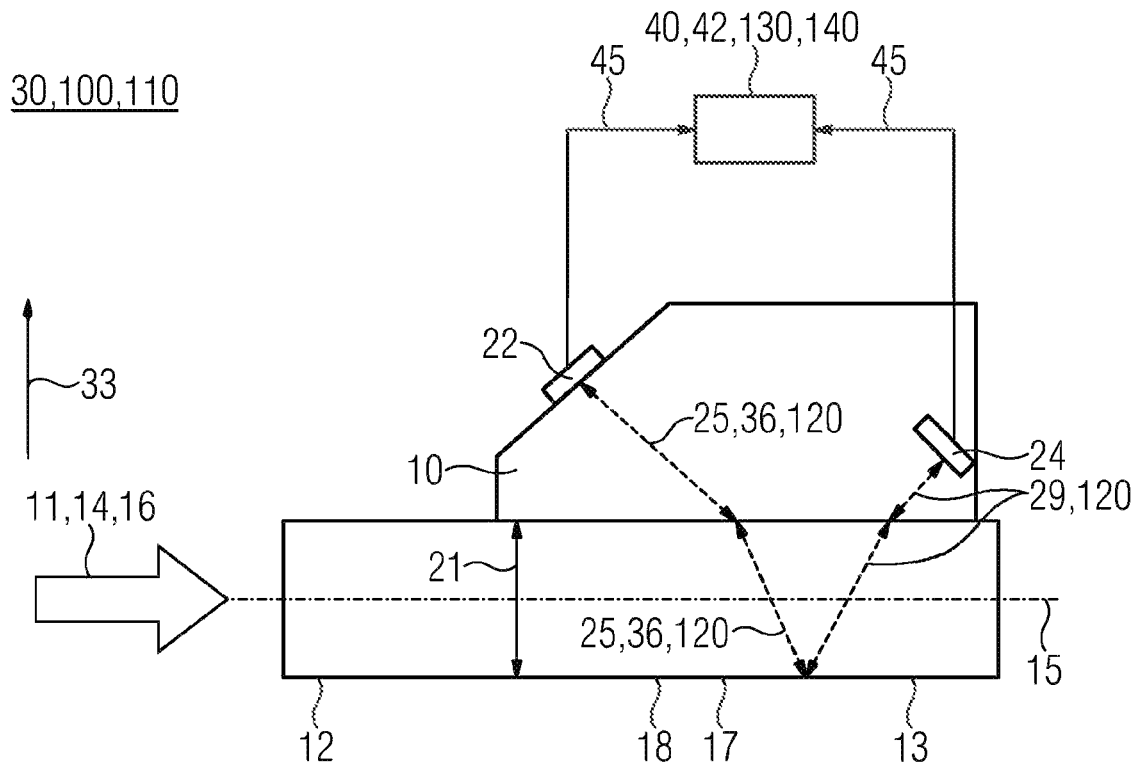
FIG. 2 shows a detailed view of a first flow rate sensor in a second embodiment of the flow measurement system in the longitudinal section in accordance with the invention.

A longitudinally sectioned detailed view of the first flow rate sensor 10 in accordance with a first embodiment of the disclosed flow measurement system 30 is depicted in FIG. 2. The first flow rate sensor 10 comprises a first ultrasonic head 22, which is suitable for emitting a flow measurement pulse 35 (not shown). The first flow rate sensor 10 is, as also represented in FIG. 1, mounted on the tube 12, i.e., the tube wall 13 thereof, and is in an active operating state. The first step 110 of the method 100 has thus already been concluded in accordance with FIG. 2. The first ultrasonic head 22 is also configured to emit an ultrasonic pulse 25 in a second step 120 of the method 100, via which the tube wall thickness 19 is to be determined. The ultrasonic pulse 25 spreads along a main direction of propagation 36, which is represented in FIG. 2 by the directions of the arrows. The ultrasonic pulse 25 is deflected at the tube wall 13 and enters the tube wall 13 in a diagonal direction with regard to the tube axis 15. Further, the ultrasonic pulse 25 is reflected in an opposing region off an inside 17 of the tube wall 18 as an ultrasonic echo 29. The ultrasonic echo 29 is here likewise deflected upon exiting from the tube wall 13. The ultrasonic echo 29 is received by a second ultrasonic head 24 that is arranged in the first flow rate sensor 10. Based on measurement signals 45 from the first and second ultrasonic head 22, 24, the tube wall thickness 19 is determined in the evaluation unit 40. To this end, the measurement signals 45 are used to determine a signal propagation time of the ultrasonic pulse 25 and its ultrasonic echo 29. Based on the temperature 14 of the medium 11 and information about the material of the tube wall 13 a velocity of sound in the tube wall 13 can be determined. Using this, it is possible to determine the tube wall thickness 19 in the third step 130, based on the signal propagation time of the ultrasonic pulse 25 and its ultrasonic echo 29 from the first ultrasonic head 22 to the second ultrasonic head 24. In addition, by taking account of an external tube diameter 23, the internal tube diameter 21 can also be determined in the third step 130. Here, the deflection behavior of the ultrasonic pulse 25 and/or of the ultrasonic echo 29 on entering or exiting from the tube wall 13 can also be taken into account. In a fourth step 140, the determined tube wall thickness 19 and/or the internal tube diameter 21 is stored in the evaluation unit 40 as a calibration parameter. Calibration parameters, such as the tube wall thickness 19 and/or the internal tube diameter 21, can be used in a measurement operation, as shown, for example, in FIG. 1, in order to determine the throughput of medium 11, i.e., substantially the flow velocity 16 thereof. The method 100 shown in FIG. 2 for calibration can easily be integrated into a measurement operation as in FIG. 1, for example, by a time slice mode. A change in the tube wall thickness 19, and thus of the internal tube diameter 21, can be determined by comparison to historical values 42 for these. To this end, corresponding historical values 42 for the tube wall thickness 19 or the internal tube diameter 21 are stored in the evaluation unit 40. An increase in the internal tube diameter 21 thus indicates corrosion on an inside 17 of the tube wall 13. In contrast, a decrease in the internal tube diameter 21 indicates soiling of the tube 12, as a result of which the tube 12 is constricted. Such states can be displayed to a user via the evaluation unit 40.

Furthermore, in the embodiment in accordance with FIG. 2, a surface roughness 27 on the inside 17 of the tube wall 13 is determined. Here, an ultrasonic pulse 25 is emitted from the first ultrasonic head 22 into the tube wall 13. Part of the ultrasonic pulse 25 is reflected off the inside 17 of the tube wall 13, as a consequence of the surface roughness 27 there, as an ultrasonic echo 29 to the first ultrasonic head 25. The ultrasonic echo 29 received by the first ultrasonic head 22 has a reduced intensity compared to the ultrasonic pulse 25 emitted. The ultrasonic pulse 25 is scattered by the surface roughness 27, so that the ultrasonic echo 29 received by the second ultrasonic head 24 has a reduced intensity compared to the ultrasonic pulse 25 emitted. The intensities of the ultrasonic echo 29 received by the first or second ultrasonic head 22, 24 are detected and are sent to the evaluation unit 40 as measurement signals 45. By evaluating these, the surface roughness 27 on the inside 17 of the tube wall 13 is detected. The operating behavior of the first flow rate sensor 10 can be simulated using a computer program product 50 (not shown in greater detail) which is formed as a digital twin of at least the first flow rate sensor 10.

Figure 3:
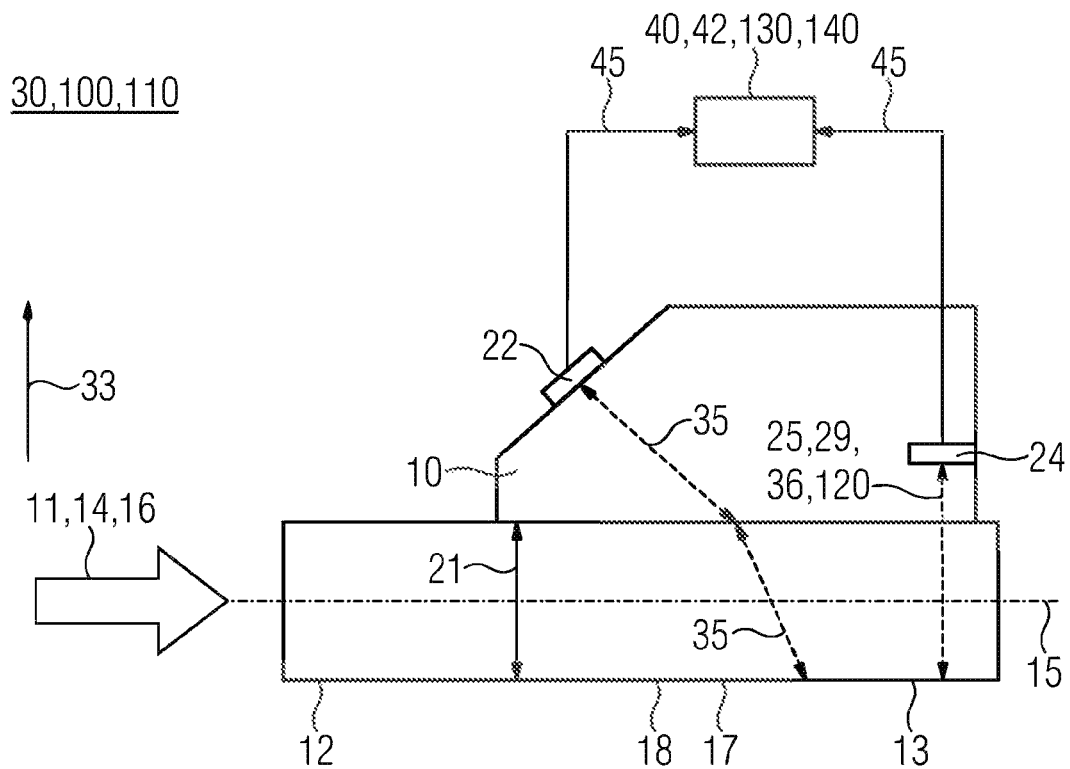
FIG. 3 shows a detailed view of a first flow rate sensor in a third embodiment of the flow measurement system in the longitudinal section in accordance with the invention.

FIG. 3 schematically shows a first flow rate sensor 10 in a second embodiment of the flow measurement system 30 in a longitudinal section. FIG. 3 assumes that a first step 110 of the method 100 has already been concluded, in which the flow measurement system 30 is provided in an active operating state. The first flow rate sensor 10 has a first ultrasonic head 22, which is oriented substantially diagonally with respect to the tube axis 15 of the tube 12. The first ultrasonic head 22 is arranged in the first flow rate sensor 10 such that a flow measurement pulse 35 is deflected in a diagonal direction into the tube wall 13. Upon entering the tube wall 13, the flow measurement pulse 35 is deflected. The flow measurement pulse 35 is part of the measurement operation of the flow measurement system 30. For the flow measurement pulse 35, measured signals 45 are sent to an evaluation unit 40. Furthermore, the first flow rate sensor 10 has a second ultrasonic head 24 that is arranged in the axial direction, i.e., along the tube axis 15, spaced apart from the first ultrasonic head 22. The second ultrasonic head 24 is located between the first ultrasonic head 22 and the second flow rate sensor 20 (not shown in FIG. 3). The second ultrasonic head 24 is configured to send an ultrasonic pulse 25 substantially in a radial direction 33 into the tube wall 13. This occurs in a second step 120 of the method 100. The ultrasonic pulse 25 passes through the medium 11 and, in an opposing region, is reflected off an inside 17 of the tube wall 13 as an ultrasonic echo 29. The second ultrasonic head 24 is also configured to receive the ultrasonic echo 29 in the second step 120. Any deflection of the ultrasonic pulse 25 on entering the tube wall 13 and on exiting the tube wall 13 is minimal and is not shown in FIG. 3. The ultrasonic pulse 25 and the ultrasonic echo 29 have opposing main directions of propagation 36, which are represented by arrows in FIG. 3. The second ultrasonic head 24 is suitable, in conjunction with the evaluation unit 40, for measuring a signal propagation time of the ultrasonic pulse 25 and of the ultrasonic echo 29. To this end, corresponding measurement signals 45 are transmitted to the evaluation unit 40. The evaluation unit 40 is also configured to take account of a temperature 14 of the medium 11 and information about the material of the medium 11, in order to ascertain a velocity of sound present in the medium 11. Using this, the signal propagation time of the ultrasonic pulse 25 and its ultrasonic echo 29 and an installation position of the second ultrasonic sensor 24, at least one tube wall thickness 19 can be determined in a third step 130. Using this, the internal tube diameter 19 can also be determined in the third step 130. This occurs via a calculation in the evaluation unit 40. The determined tube wall thickness 19 is stored as a calibration parameter in the evaluation unit 40 in a fourth step 140 of the method 100. In particular, the determined tube wall thickness 19 or the determined internal tube diameter 21 is taken into account when determining the throughput of medium 11 through the tube 12. Owing to the substantially radial orientation of the second ultrasonic head 24, a clear ultrasonic echo 29 is generated, thereby enabling the tube wall thickness 19 to be determined precisely. The second ultrasonic head 24 is, independently of the first ultrasonic head 22, suitable for implementing the inventive method 100. Historical values 42 for the tube wall thickness 19 and/or for the internal tube diameter 21 are stored in the evaluation unit 40. By comparing the determined tube wall thickness 19 and/or the determined internal tube diameter 21 with the associated historical values 42, any corrosion on the inside 17 of the tube wall 13 or any soiling on the inside 17 of the tube wall 13 can be identified. The method 100 thus overall permits a fast and precise calibration of the flow measurement system 30, but also reliable diagnostics as regards the condition of the tube 12. The operating behavior of the first flow rate sensor 10 can be simulated using a computer program product 50 (not shown in greater detail) which is formed as a digital twin of at least the first flow rate sensor 10.

Figure 4:
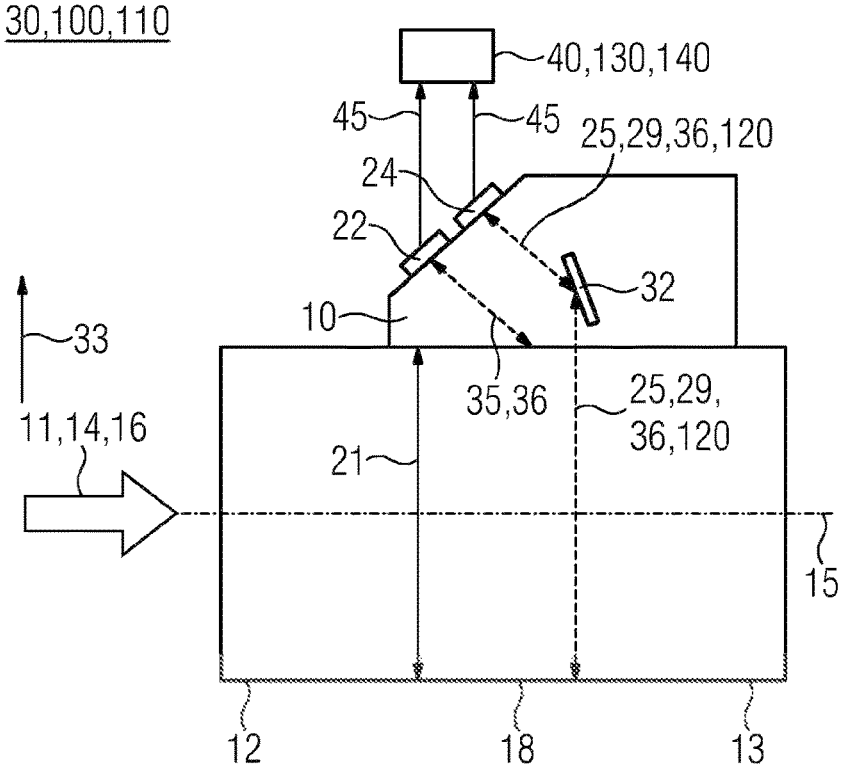
FIG. 4 shows a detailed view of a first flow rate sensor in a fourth embodiment of the flow measurement system in the longitudinal section in accordance with the invention.

A first flow rate sensor 10 in accordance with a third embodiment of the flow measurement system 30 is schematically shown in FIG. 4 in a longitudinal section. The first flow rate sensor 10 has a first ultrasonic head 22 that is configured to emit a flow measurement pulse 35 into the medium 11 in a measurement operation. The flow measurement system 30 in accordance with FIG. 1 is in an active operating state, so that the first step 110 of the method 100 has already been concluded. The first ultrasonic head 22 is oriented, with respect to the main direction of propagation 36 of the flow measurement pulse 35, substantially diagonally to tube axis 15. For the measurement operation, measurement signals 45 can be transmitted from the first ultrasonic head 22 to an evaluation unit 40. The first flow rate sensor 10 also has a second ultrasonic head 24 that is arranged in the region of the first ultrasonic head 22. The second ultrasonic head 24 is oriented substantially in parallel to the first ultrasonic head 22. Furthermore, the first flow rate sensor 10 has an ultrasonic reflector 32 that is arranged for the deflection of an ultrasonic pulse 25 from the second ultrasonic head 24. The ultrasonic reflector 32 is oriented such that the ultrasonic pulse 25 is sent substantially along a radial direction 33 into the tube wall 13. The ultrasonic pulse 25 passes through the tube wall 13 and is reflected off a region on an inside 17 of the tube wall 13 opposite the first flow rate sensor 10 as an ultrasonic echo 29. The ultrasonic echo 29 is deflected by the ultrasonic reflector 32 to the second ultrasonic head 24. The emission of the ultrasonic pulse 25 and receipt of the ultrasonic echo 29 occurs in a second step 120 of the method 100. Owing to the ultrasonic reflector 32 the second ultrasonic head 24 can be mounted in an easily accessible manner in the first flow rate sensor 10. This simplifies the structure of the first flow rate sensor 10 and makes it cost-efficient. The emission of the ultrasonic pulse 25 substantially in the radial direction 33 results in a clear ultrasonic echo 29, enabling a particularly precise determination of a signal propagation time. The signal propagation time here represents the duration between an emission of the ultrasonic pulse 25 and the receipt of the associated ultrasonic echo 29. By taking account of a velocity of sound in the material of the tube wall 13 and an installation position of the second ultrasonic head 24 the tube wall thickness 19 can be determined using the signal propagation time. The determination of the tube wall thickness 19 occurs in a third step 130 of the method 100. Further, at least the determined tube wall thickness 19 is stored in the evaluation unit 40 as a calibration parameter in a fourth step 140. Using the tube wall thickness 19, it is also possible, by taking into account an external tube diameter 23, to determine an internal tube diameter 21 that can likewise be stored in the evaluation unit 40 as a calibration parameter in the fourth step. In addition, historical values 42 for the tube wall thickness 19 and/or for the internal tube diameter 21 can be stored in the evaluation unit 40. By comparing a determined tube wall thickness 19 and/or a determined internal tube diameter 21 to the corresponding historical values 42, any corrosion or soiling on the inside 17 of the tube 12 can be determined. An increase in the internal tube diameter 21 is caused by corrosion of the tube wall 13, whereas a reduction in the internal tube diameter 21 is caused by soiling on the inside 17 of the tube wall 13. As a result of such soiling, the tube 12 is constricted. The embodiment shown in FIG. 4 allows the method 100 for calibration to be integrated into a measurement operation. To this end, the first and second ultrasonic heads 22, 24 can be operated in a time slice mode. The method 100 can easily be introduced into a continuous operation of the flow measurement system 30 (not shown in greater detail), so that the calibration thereof can frequently be adjusted. As a result, an exact measurement operation is reliably possible. The operational behavior of the first flow rate sensor 10 can be simulated using a computer program product 50 (not shown in greater detail), which is formed as a digital twin of at least the first flow rate sensor 10.

Figure 5:
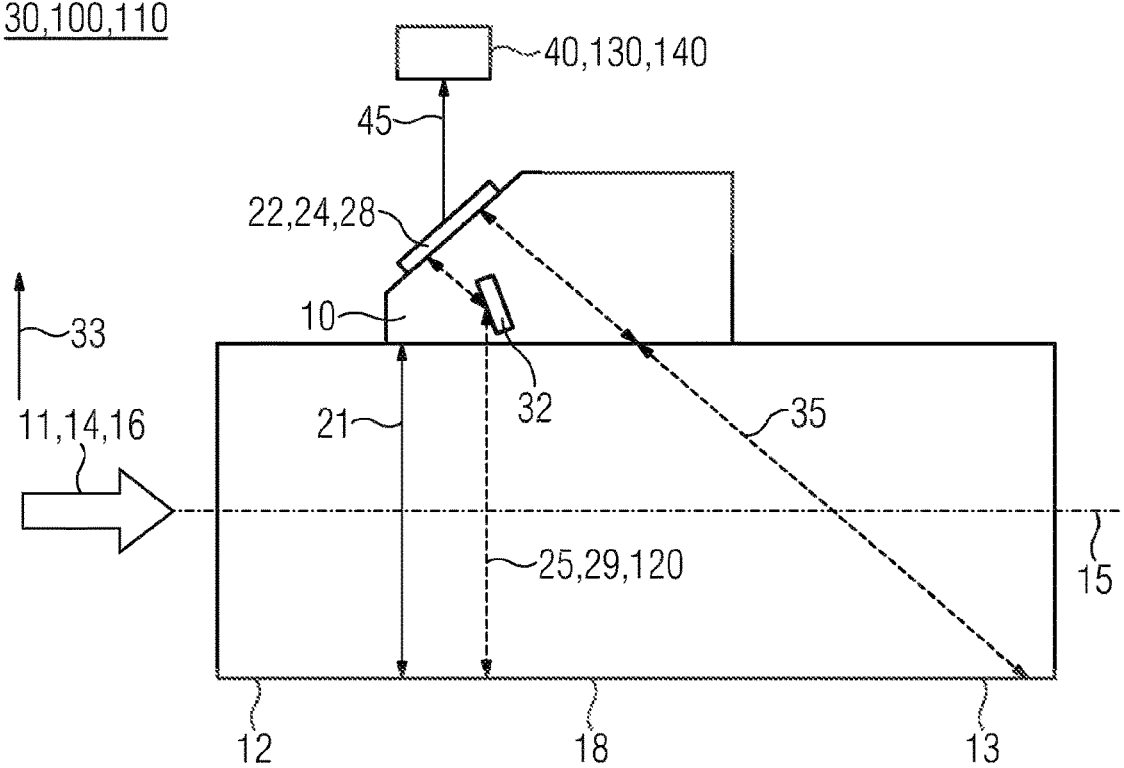
FIG. 5 shows a detailed view of a first flow rate sensor in a fifth form of embodiment of the flow measurement system in the longitudinal section in accordance with the invention.

Further, FIG. 5 schematically shows a first flow rate sensor 10 in accordance with a third f embodiment of the flow measurement system 30 in a longitudinal section. The flow measurement system 30 is already mounted on the tube 12 in FIG. 5 and is in an active operational state. The first step 110 of the method 100 has hence already been concluded in FIG. 5. The first flow rate sensor 10 has a combined ultrasonic head 28 that comprises a first and a second ultrasonic head 22, 24. The first and second ultrasonic heads 22, 24 are sections of the combined ultrasonic head 28 that can be actuated independently of one another. The first ultrasonic head 22 is arranged such that in a measurement operation a flow measurement pulse 35 is sent, with respect to the tube axis 15, substantially diagonally into the medium 11. The second ultrasonic head 24 arranged adjacent to the first ultrasonic head 22 is configured to emit, independently of the first ultrasonic head 22, and thus also independently of the flow measurement pulse 35, an ultrasonic pulse 25, via which the tube wall thickness 19 of the tube 12 is to be ascertained. The ultrasonic pulse 25 is emitted by the second ultrasonic head 24 substantially diagonally to the tube axis 15 and is deflected via an ultrasonic reflector 32 substantially in a radial direction 33. The ultrasonic reflector 32 is positioned such that the flow measurement pulse 35 can pass through the ultrasonic reflector 32. The ultrasonic pulse 25 from the second ultrasonic head 24 passes through the pipe wall 13 substantially in the radial direction 33, and at a region of the pipe wall 13 opposite the first flow rate sensor 10 is reflected off an inside 17 as an ultrasonic echo 29. The ultrasonic echo 29 reaches the ultrasonic reflector 32, by which the ultrasonic echo 29 is deflected back to the second ultrasonic head 24. The emission of the ultrasonic pulse 25 substantially in a radial direction 33 results in a clear ultrasonic echo 29, enabling a particularly precise determination of a signal propagation time. The signal propagation time here represents the duration between an emission of the ultrasonic pulse 25 and the receipt of the associated ultrasonic echo 29. To this end, suitable measurement signals 45 can be transmitted from the combined ultrasonic head 28 to the evaluation unit 40. By taking account of a velocity of sound in the material of the tube wall 13 and an installation position of the second ultrasonic head 24, the signal propagation time can used to determine the tube wall thickness 19. The determination of the tube wall thickness 19 occurs in a third step 130 of the method 100. Further, the determined tube wall thickness 19 can be stored in the evaluation unit 40 as a calibration parameter in a fourth step 140. Using the tube wall thickness 19, an internal tube diameter 21 can also be determined in the third step 130 by taking into account an external tube diameter 23. In addition, historical values 42 for the tube wall thickness 19 and/or for the internal tube diameter 21 can be stored in the evaluation unit 40. By comparing a determined tube wall thickness 19 and/or a determined internal tube diameter 21 to the corresponding historical values 42, any corrosion or soiling on an inside 17 of the tube wall 13 can be determined. An increase in the internal tube diameter 21 is caused by corrosion of the tube wall 13, whereas a reduction in the internal tube diameter 21 is caused by soiling on the inside 17 of the tube wall 13. As a result of such soiling, the tube 12 is constricted. The embodiment shown in FIG. 5 enables the measurement operation with the flow measurement pulse 35 and the method 100 to be implemented substantially simultaneously. As a result, a measurement operation is continuously possible, simultaneously with a recalibration of the flow measurement system 30. The embodiment in FIG. 5 is therefore particularly suitable for applications in which ongoing flow measurement is essential and at the same time there are special precision requirements that demand substantially continuous recalibration. The operational behavior of the first flow rate sensor 10 can be simulated using a computer program product 50 (not shown in greater detail), which is formed as a digital twin of at least the first flow rate sensor 10.

Figure 6:
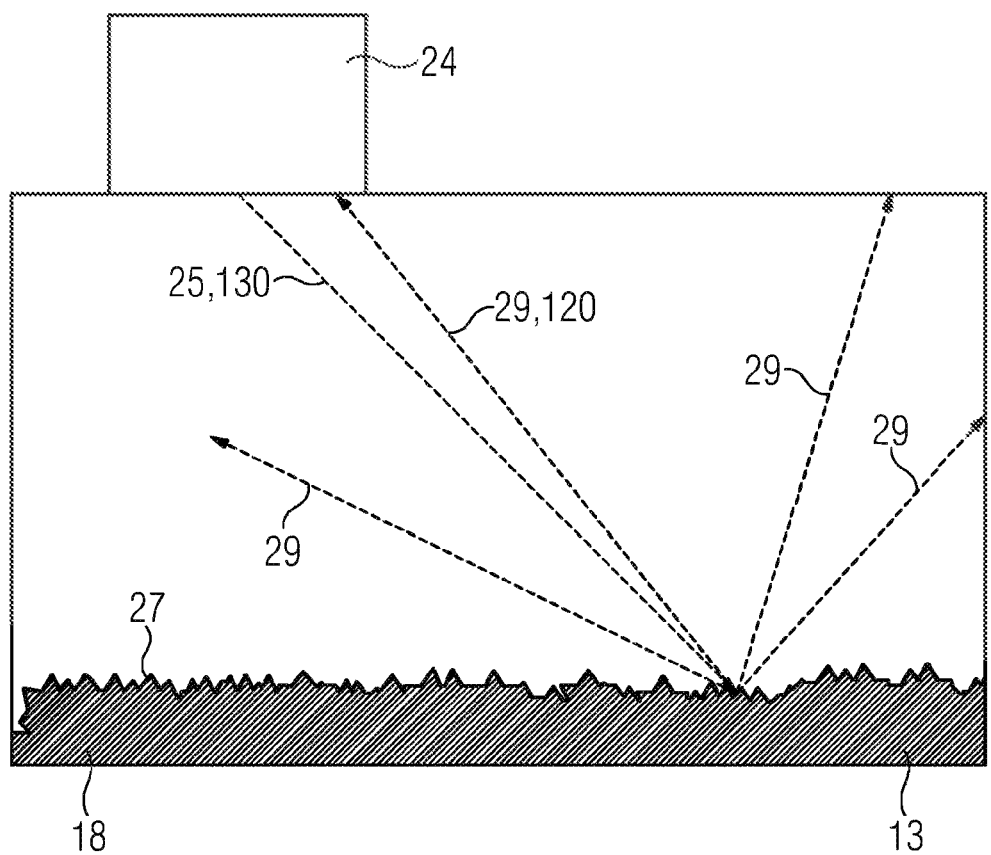
FIG. 6 shows a representation for a determination of a surface roughness in the method in the longitudinal section in accordance with the invention.

FIG. 6 shows an outline showing a determination of a surface roughness in the method 100 in accordance with the functional principle. FIG. 6 schematically shows a second ultrasonic head 24, which during the second step 120 of the method 100 sends an ultrasonic pulse 25 diagonally to an opposing region on an inside 17 of the tube wall 13. The opposing region of the tube wall 13 has a surface roughness 27 which is representative of the inside 17 of the tube wall 13. Owing to the surface roughness 27 on the inside 17, the ultrasonic pulse 25 is reflected in different directions as a plurality of ultrasonic echoes 29. An intensity of the ultrasonic echo 29, which is reflected back to the second ultrasonic head 24, is reduced compared to an intensity of the ultrasonic pulse 25. The less the surface roughness 27, the less the intensity of the ultrasonic echo 29 reflected to the second ultrasonic head 24. Conversely, the greater the intensity of the ultrasonic echo 29 reflected to the second ultrasonic head 24, the greater the surface roughness 27. Using value tables or an algorithm in the evaluation unit 40 (not shown in greater detail), it is possible to quantitatively detect the surface roughness 27, in particular by taking into account information about the material of the tube wall 13. To this end, a ratio between the intensity of the emitted ultrasonic pulse 25 and the received ultrasonic echo 29 is formed. The determined surface roughness 27 can be stored in the evaluation unit 40 as a calibration parameter. The surface roughness 27 can be used for a measurement operation of the flow measurement system 30 (not depicted in greater detail), in particular in the Hagen-Poiseuille equation. Alternatively or additionally, the determined surface roughness 27 can also be used to quantify the progress of corrosion of the inside 17 of the tube wall 13. The reflection behavior of the tube wall 13 as a function of the surface roughness 27 forms part of an operating behavior of the flow rate sensor 10, which can be simulated by a computer program product 50. The computer program product 50 is formed as a digital twin, by which at least the opposing tube wall 18 can be readjusted as regards surface roughness 27.

Figure 7:
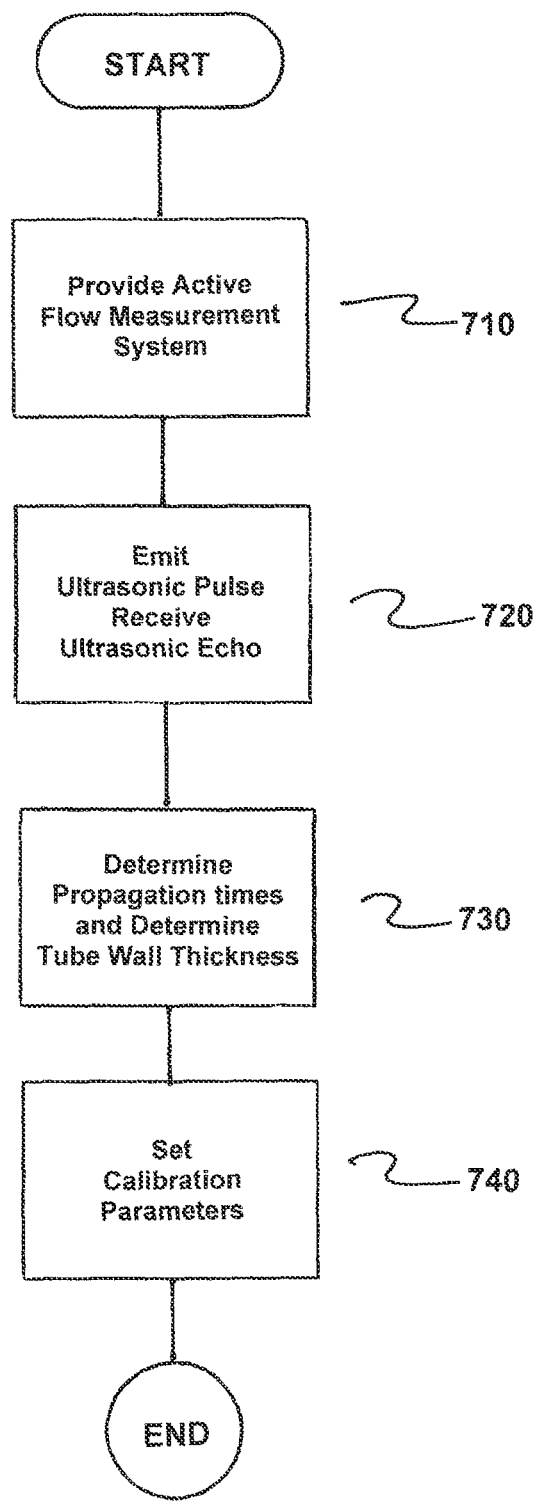
FIG. 7 is a flowchart of the method in accordance with the invention.

FIG. 7 is a flowchart of the method 100 for calibrating a flow measurement system 30 which is mounted on a tube 12 containing a medium 11. The method comprises a) placing the flow measurement system 30, which comprises a first flow rate sensor 10, into an active operational state, as indicated in step 710.

Next, b) an ultrasonic pulse 25 is emitted into a tube wall 13 of the tube 12 via a first or second ultrasonic head 22, 24 of the first flow rate sensor 10 and an ultrasonic echo 29 is received via the second ultrasonic head 24, as indicated in step 720.

Next, c) a signal propagation time of the ultrasonic pulse 25 and the ultrasonic echo 29 is determined and the signal propagation time is used to determine a tube wall thickness 19, as indicated in step 730.

Next, d) calibration parameters of the first flow rate sensor 30 as set, as indicated in step 740. Here, the calibration parameters comprise the tube wall thickness 19.

In accordance with the method, when emitting the ultrasonic pulse 25 into the tube wall 13 of the tube 12, the ultrasonic pulse 25 is emitted in a diagonal direction into the medium 11 to determine a surface roughness 27 of an inside 17 of the tube wall 13, and an intensity of the received ultrasonic echo 29 is detected and compared to an intensity of the emitted ultrasonic pulse 25. In addition; based on the comparison, the surface roughness 27 of the inside 17 of the tube wall 13 is determined, and the determined surface roughness 27 of the inside 17 of the tube wall 13 is set as a calibration parameter when setting calibration parameters of the first flow rate sensor 30.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for calibrating a flow measurement system which is mounted on a tube containing a medium, the method comprising:

a) placing the flow measurement system, which comprises a first flow rate sensor, into an active operational state;
b) emitting an ultrasonic pulse into a tube wall of the tube via a first or second ultrasonic head of the first flow rate sensor and receiving an ultrasonic echo via the second ultrasonic head;
c) determining a signal propagation time of the ultrasonic pulse and the ultrasonic echo and utilizing the signal propagation time to determine a tube wall thickness; and
d) setting calibration parameters of the first flow rate sensor, the calibration parameters comprising the tube wall thickness;
   wherein, during said emitting the ultrasonic pulse into the tube wall of the tube, the ultrasonic pulse is emitted in a diagonal direction into the medium to determine a surface roughness of an inside of the tube wall, and an intensity of the received ultrasonic echo is detected and compared to an intensity of the emitted ultrasonic pulse; and
   wherein based on said comparison, the surface roughness of the inside of the tube wall is determined, and the determined surface roughness of the inside of the tube wall is set as a calibration parameter when setting calibration parameters of the first flow rate sensor.

2. The method as claimed in claim 1, wherein the second ultrasonic head of the first flow rate sensor is assigned an ultrasonic reflector for deflection of the ultrasonic pulse.

3. The method as claimed in claim 1, wherein the first ultrasonic head is designed to emit a flow measurement pulse.

4. The method as claimed in claim 2, wherein the first ultrasonic head is designed to emit a flow measurement pulse.

5. The method as claimed in claim 3, wherein during said emitting the ultrasonic pulse into the tube wall of the tube the ultrasonic pulse is distinguished from the flow measurement pulse by an electronic filter.

6. The method as claimed in claim 5, wherein the electronic filter comprises a bandpass filter.

7. The method as claimed claim 3, wherein the ultrasonic pulse in accordance with step b) and the flow measurement pulse are variously formed by time-delayed emission.

8. The method as claimed claim 5, wherein the ultrasonic pulse in accordance with step b) and the flow measurement pulse are variously formed by time-delayed emission.

9. The method as claimed in claim 1, wherein during step b) the ultrasonic pulse has at least one of a bandwidth of 25 kHz to 8 MHz and a pulse duration of 0.1 us to 5.0 ms.

10. The method as claimed in claim 1, wherein step c) is further implemented utilizing at least one of information about a material of the tube wall and information about a connection of the first flow rate sensor to the tube.

11. The method as claimed in claim 1, wherein the tube wall thickness determined in step c) is utilized to determine any corrosion of the tube or any soiling of the tube.

12. A flow measurement system, comprising:
a first flow rate sensor;
a second flow rate sensor, the first flow rate sensor is configured to emit a flow measurement pulse via a first ultrasonic head and the second flow rate sensor is configured to receive an echo of the flow measurement pulse, and the first flow rate sensor including a second ultrasonic head for determining a tube wall thickness; and
an evaluation unit which is configured to receive and evaluate measurement signals from the first flow rate sensor, the evaluation unit being further configured to perform calibrations by:
a) placing the flow measurement system into an active operational state;
b) emitting an ultrasonic pulse into a tube wall of a tube via the first or second ultrasonic head of the first flow rate sensor and receiving an ultrasonic echo via the second ultrasonic head;
c) determining a signal propagation time of the ultrasonic pulse and the ultrasonic echo and utilizing the signal propagation time to determine a tube wall thickness; and
d) setting calibration parameters of the first flow rate sensor, the calibration parameters comprising the tube wall thickness;
   wherein, during said emitting the ultrasonic pulse into the tube wall of the tube, the ultrasonic pulse is emitted in a diagonal direction into the medium to determine a surface roughness of an inside of the tube wall, and an intensity of the received ultrasonic echo is detected and compared to an intensity of the emitted ultrasonic pulse; and
   wherein based on said comparison, the surface roughness of the inside of the tube wall is determined, and the determined surface roughness of the inside of the tube wall is set as a calibration parameter when setting calibration parameters of the first flow rate sensor.

13. The flow measurement system as claimed in claim 12, wherein the evaluation unit is configured as a local evaluation unit, which is accommodated in one of the flow rate sensors or is configured as an industrial controller.

14. A computer program product, which is established to simulate an operating behavior of a flow measurement system which is mounted on a tube, wherein the flow measurement system is configured as claimed in claim 13.

* * * * *